United States Patent [19]

Dorpmund et al.

[11] 4,289,044
[45] Sep. 15, 1981

[54] MOTOR VEHICLE TRANSMISSION

[75] Inventors: Heinz Dorpmund, Wolfsburg; Gerd Oberpichler, Brunswick, both of Fed. Rep. of Germany

[73] Assignee: Volkswagenwerk Aktiengesellschaft, Wolfsburg, Fed. Rep. of Germany

[21] Appl. No.: 51,904

[22] Filed: Jun. 25, 1979

[30] Foreign Application Priority Data

Jul. 12, 1978 [DE] Fed. Rep. of Germany ....... 2830543

[51] Int. Cl.³ .................... F16H 47/08; F16H 57/10
[52] U.S. Cl. ........................................ 74/688; 74/732; 74/718; 74/789
[58] Field of Search ................ 74/677, 688, 731, 732, 74/718, 730, 789, 790, 337.5, 372

[56] References Cited

U.S. PATENT DOCUMENTS

| | | | |
|---|---|---|---|
| 1,099,587 | 6/1914 | Bugatti | 74/372 |
| 1,102,427 | 7/1914 | Morgan | 74/372 |
| 1,597,944 | 8/1926 | Wilson | 74/372 |
| 1,606,948 | 11/1926 | La May | 74/372 |
| 2,725,762 | 12/1955 | Hettinger et al. | 74/688 |
| 3,024,668 | 3/1962 | Kronogard et al. | 74/677 X |
| 3,159,051 | 12/1964 | Herndon et al. | 74/688 X |
| 3,188,886 | 6/1965 | Jandasek | 74/688 |
| 3,270,585 | 9/1966 | Livezey | 74/677 |
| 3,277,744 | 10/1966 | Stockton | 74/677 |
| 3,295,392 | 1/1967 | Scheiter | 74/677 |
| 3,299,739 | 1/1967 | Stockton | 74/688 |
| 3,314,307 | 4/1967 | Egbert | 74/688 |
| 3,367,211 | 2/1968 | Borman et al. | 74/677 |
| 3,371,555 | 3/1968 | Tuck et al. | 74/677 |
| 3,489,037 | 1/1970 | Mori et al. | 74/688 |
| 3,772,939 | 11/1973 | Hause | 74/677 |
| 3,838,611 | 10/1974 | Koivunen | 74/731 X |
| 3,893,350 | 7/1975 | Gingras | 74/688 |
| 3,903,757 | 9/1975 | Hau et al. | 74/730 X |

FOREIGN PATENT DOCUMENTS

| | | |
|---|---|---|
| 1020874 | 5/1959 | Fed. Rep. of Germany . |
| 2513570 | 10/1975 | Fed. Rep. of Germany . |
| 1625124 | 11/1975 | Fed. Rep. of Germany . |
| 1175780 | 4/1959 | France ................................. 74/688 |

Primary Examiner—George H. Krizmanich
Attorney, Agent, or Firm—Brumbaugh, Graves, Donohue & Raymond

[57] ABSTRACT

A motor vehicle hydrodynamic transmission is provided with a torque converter and a planetary gear train. In order to provide a compact transmission arrangement, the stator of the torque converter is connected to the planetary gear carrier by means of a freewheel, and the planetary gear carrier is connected to the housing by another freewheel. The planetary gear is also connected to the housing by a controllable brake. The brake and freewheel connecting the carrier to the housing are arranged radially outward from the planetary gear train. The second sun gear of the planetary gear train and the second brake, which acts on the second sun gear, are arranged on the side of the planetary gear train facing away from the torque converter. The output of the planetary gear train is a pinion, which is connected to the inertial gear and located between the torque converter and the planetary gear train.

5 Claims, 3 Drawing Figures

MOTOR VEHICLE TRANSMISSION

BACKGROUND OF THE INVENTION

This invention relates to hydrodynamic transmissions for use in motor vehicles, particularly automobiles. In particular, this invention relates such transmissions which include a torque converter and a planetary gear train with hydraulically actuable elements associated with individual transmission elements, for engaging the various gears to provide multiple forward and reverse gear speeds.

This invention relates in particular to hydrodynamic mechanical transmissions, which include a planetary gear train which is provided with a first sun gear which can be connected by way of a first clutch to a turbine output of the torque converter. A second sun gear is provided and is connected with the turbine by way of a second clutch. A planetary gear carrier, which can be connected by means of a third clutch, circumventing the torque converter, directly with the torque converter impeller is provided and carries the first and second planetary gears which mesh with each other and with the first and second sun gears. There is also provided an inertial ring gear which forms the output drive and meshes with the second planetary gear. The planetary gear carrier is supported by a first freewheel which is connected to the housing of the planetary gear train. First and second brakes are also provided for interconnecting the housing and the planetary gear carrier or the second sun gear.

Transmissions of this type can provide a relatively small space transmission having four forward and one reverse gear whereby the fourth forward gear produces a transmission of the output shaft with speed increase (overdrive). In this type of transmission a connecting of the third clutch in the third or fourth gear provides a partial or complete bridging of the torque converter, thereby eliminating power losses associated with the torque converter.

Commonly known embodiments of this type of transmission, as are known for German Patent disclosures Nos. 1,625,124 and 2,513,570, are "driving through" transmissions which provide for driving of the torque converter at one end by an engine shaft and an output drive or takeoff shaft at the opposite end of the gear train. Embodiments of this type are not favorable in automobiles with engine and transmission in direct succession, which have a pinion driving the vehicle axle between the torque converter and gear train. Difficulties most often arise in cases where such an engine transmission aggregate is to be accommodated in a transverse arrangement in a vehicle.

It is therefore an object of the present invention to provide a new and improved hydrodynamic transmission having a torque converter and a planetary gear system.

It is a further object of the present invention to provide such a transmission which is constructed with a return or reverse design, wherein the power takeoff is placed between the torque converter and the planetary gear train.

It is a further object of the present invention to provide such a transmission which is axially as short as possible, so that the transmission can be accommodated in line with the driving engine in a transverse configuration in a vehicle.

SUMMARY OF THE INVENTION

In accordance with the present invention there is provided a motor vehicle transmission which comprises a hydrodynamic torque converter including a driving impeller connected to an input shaft, a stator and an output turbine. There is also provided a planetary gear train in a stationary gear housing, which includes a first sun gear, a second sun gear arranged on the side of the first sun gear away from the torque converter and an inertial ring gear connected to a power output. There is provided a planetary gear carrier having a first planetary gear meshing with the first sun gear and a second planetary gear meshing with the first planetary gear, the second sun gear and the inertial gear. There is also provided first controllable clutch means for interconnecting the first sun gear and the impeller, by the output turbine. There is a second controllable clutch means for interconnecting the second sun gear and the impeller, by the output turbine and a third controllable clutch means for interconnecting the planetary gear carrier and the impeller. A first freewheel is arranged radially outward from the planetary gear train for connecting the planetary gear carrier in the housing. A second freewheel is provided connecting the stator and the planetary gear carrier. A first controllable brake is arranged radially outward from the gear train and selectively connects the housing and the planetary gear carrier and a second controllable brake is arranged on the side of the gear train away from the torque converter for selectively connecting the housing and the second sun gear.

In an especially advantageous arrangement there is provided a hollow shaft connecting the planetary gear carrier and the second freewheel. The third clutch connects the hollow shaft and the impeller. The first and second clutch means can comprise a draw key arrangement, for connecting a central shaft to the first and second sun gears, and controllable means for connecting the central shaft to the torque converter impeller by the turbine. The controllable connecting means can comprise a clutch connecting the central shaft to the turbine and hydraulic fluid connecting the turbine to the impeller. Alternatively, the controllable connecting means can comprise a rigid connection between the central shaft and the turbine, with hydraulic fluid connecting the turbine and the rotor over a fluid space. In this embodiment there is provided valve means, for filling and draining the hydraulic fluid in the fluid space, to provide the controllable coupling between the turbine and the impeller.

In contrast to known transmission designs, the stator in accordance with the present invention is not supported directly over a freewheel on an element integral with the housing, but rather attains such support only on the planetary gear carrier, which itself is supported on the hosing by way of a freewheel, and possibly also a brake. It thus becomes possible to easily connect the planetary gear carrier by a short route over the third clutch with the impeller of the torque converter adjacent to the stator. Further, if the first freewheel and first brake are arranged radially outward from the planetary gear train, and the second sun gear and the second clutch acting on the second sun gear are on the side of the planetary gear train away from the torque converter, there can be obtained without difficulty, on the side of the planetary gear train facing the torque converter, a connection between the inertial gear and the output pinion, which is arranged between the torque converter and the planetary gear train.

Further shortening of the overall axial length of the transmission can be achieved, in accordance with a further characteristic of the invention, if the first and second clutch are formed by a draw key arrangement disposed inside the sun gears, which arrangement, depending on the position, positively connects a central shaft, connected to the turbine, with the first or the second sun gear. An arrangement can be provided for interrupting the driving connection between the torque converter impeller and the central shaft. This interrupting arrangement can be provided by a fourth clutch connecting the turbine wheel and the central shaft, or it can also be obtained by interruption of the hydraulic connection in the torque converter by filling and emptying the fluid containing chamber in the torque converter with a controlled valve. In this manner the draw key arrangement can be controlled, and a complete bypassing of the torque converter can be obtained in the fourth gear.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
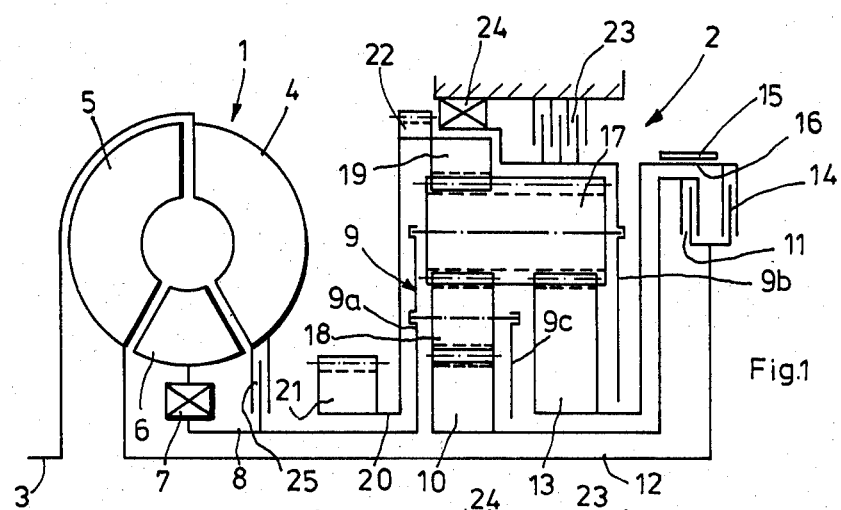
FIG. 1 is a schematic representation of a transmission in accordance with the present invention.

FIG. 1 is a schematic diagram illustrating a transmission in accordance with the present invention. The transmission includes a torque converter 1 and a gear train 2. The torque converter 1 includes an impeller 4 which is connected to an input engine shaft 3. There is also provided on output rotor 5 and a stator 6. The output rotor 5 is connected by a central shaft 12 to clutches 11 and 14 which connect output rotor 5 to the planetary gear train 2 as will be further explained. The stator 6 is provided with a one-way clutch 7 which connects the stator by hollow shaft 8 to a planetary gear carrier 9 in the planetary gear train 2. The planetary gear carrier 9 is connected by freewheel 24 to the housing of the transmission.

The planetary gear train is an epicycloid gear train designed as a Ravigneaux system. The gear train includes first and second planetary gears 18 and 17 which are mounted on planetary gear carrier 9. First planetary gear 18, mounted between carrier plates 9a and 9c, meshes with the first sun gear 10 and the second planetary gear 17. The second planetary gear 17, mounted between plates 9a and 9b, meshes with the first planetary gear 18, the second sun gear 13, and an inertial ring gear 19, which serves as a power output from the transmission through output shaft 20 and output pinion 21. The outer inertial ring gear 19 is provided with toothing 22 which meshes with a parking brake lock arrangement which is not shown in the schematic drawing.

The first sun gear 10 can be connected by controllable clutch 11 with the output turbine 5 of torque converter 1. Likewise second sun gear 13 can be connected by second clutch 14 with the output turbine rotor 5 of torque converter 1. The clutch housing 16, which encloses clutches 11 and 14 is provided with a band brake 15, for locking the second sun gear 13 with respect to the transmission housing. Planetary gear carrier 9 includes a plate 9b which is arranged on the side of planetary gears 18 and 17 away from torque converter 1. Plate 9b is provided with a radial extension, which extends outward from the planetary gear train 2, and connects with freewheel 24 and a controllable brake 23, which can lock the planetary gear carrier with respect to the transmission housing. In accordance with the arrangement of the invention freewheel 24 and controllable brake 23 are arranged radially outward from the planetary gear train, while clutches 11 and 14, and brake 15 are arranged on the side of the planetary gear train away from the torque converter 1. As will be described below, there are possible arrangements for clutches 11 and 14 which provide for even a shorter arrangement of the transmission. Because of the arrangement of the clutches 11 and 14, and the brake 15 on the side of the gear train 2 away from torque converter 1 it becomes possible to arrange ring gear 19 on the side of the planetary gear train adjacent the torque converter so that the output pinion 21 can be connected by outer concentrical shaft 20 to output inertial ring gear 19 in the center of the transmission. It also becomes possible in accordance with the arrangement of the invention to provide a simple connection between the hollow shaft 8 and the impeller 4 of torque converter 1 by means of third clutch 25.

Figure 2:
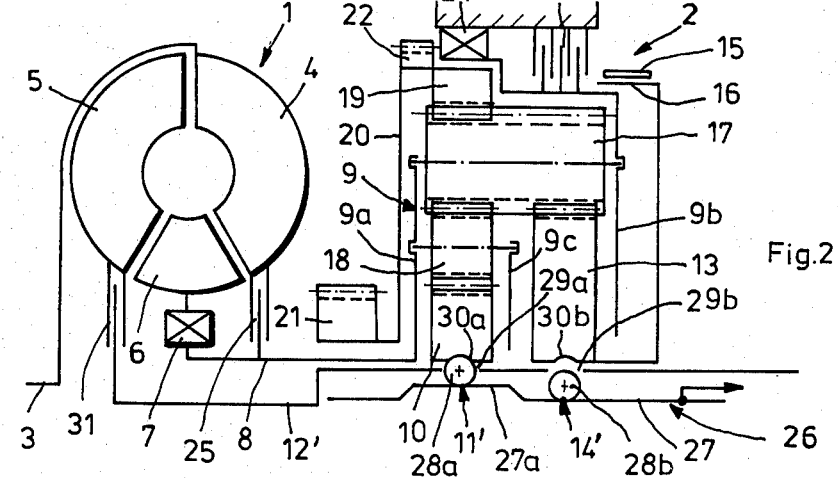
FIG. 2 is a schematic representation of an alternate embodiment of a transmission in accordance with the present invention having a draw key connection between a central shaft and the first and second sun gears, and a clutch between the central shaft and the turbine rotor.
Figure 3:
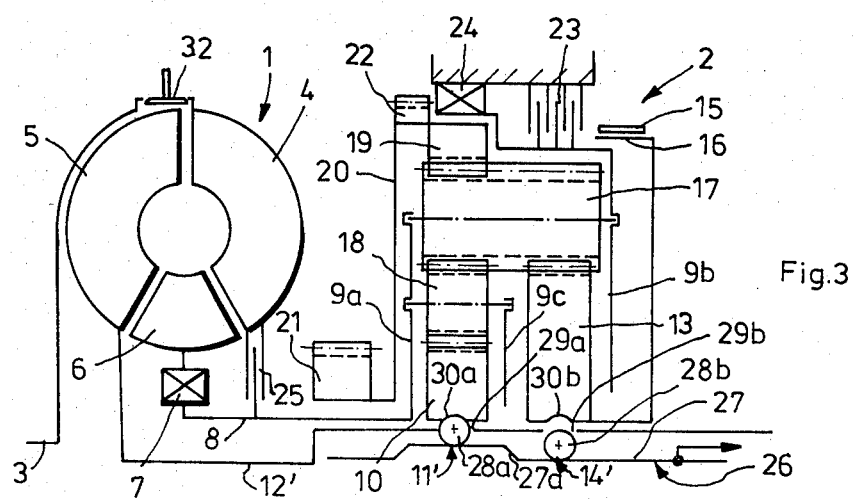
FIG. 3 is a schematic diagram of another embodiment of the present invention having a draw key arrangement for connecting a central shaft with the first and second sun gears and having control means for filing or draining a fluid space to provide a fluid connection between the impeller and the turbine rotor which is connected to the central shaft.

The embodiment schematically illustrated in FIGS. 2 and 3 differ from the embodiment illustrated in FIG. 1, in that the two clutches 11 and 14, arranged in FIG. 1 next to the planetary gear train 2, are replaced in FIGS. 2 and 3 with a draw key assembly 26, which is located within the central shafts of the transmissions. The arrangement in FIGS. 2 and 3 includes a draw key 27, which is supported within the central shaft 12' and includes an enlargement 27a which is moved between two shift positions. In one shift position there is provided a positive connection between the turbine shaft 12' and the first sun gear 10, designated 11', and in the other shift position there is a positive connection between the turbine shaft 12' and the second sun gear 13, designated 14'. As clutch elements there are provided spherical bodies 28a and 28b, which are distributed around the periphery of the draw key 27 in clearances 29a and 29b of the turbine shaft 12'. When the enlargement 27a of draw key 27 engages the respective spherical bodies 28, they are forced outwardly from the draw key into clearances 30a and 30b provided on the respective sun gears 10 and 13. The use of a draw key arranged as illustrated in FIG. 2 or FIG. 3 considerably shortens the required axial space for the transmission, even if there is provided a fourth clutch 31 between the turbine shaft 12' and the output turbine 5 of torque converter 1.

In the embodiment of FIG. 3 the fourth clutch 31 between the torque converter and the central shaft 12' is not provided. In this embodiment within the fluid cavity of the torque converter, wherein hydraulic fluid connects the turbine impeller 4 and the turbine 5, there is provided a valve 32 for selectively filling and draining the torque converter fluid cavity, thereby disconnecting the force transmitting connection impeller, which is connected to engine shaft 3, and the turbine, which is connected to shaft 12'. It is necessary to provide either the fourth clutch 31 shown in FIG. 2 or the controllable valve 32 shown in FIG. 3 so that the shaft 12' is not under load when the draw key 27 is shifted from the position engaging the first sun gear to the position engaging the second sun gear.

FIGS. 2 and 3 also illustrate the fact that band brake 15, which is connected to second sun gear 13, can be arranged radially outward from the planetary gear train 2 for further reduction of the axial length of the transmission.

By use of the planetary gear train illustrated in the drawings a total of four forward gears and one reverse gear can be obtained by control of the hydraulically actuated control elements, including clutches and brakes which have been described. The following table sets forth the control element actuation for the various gears:

| Gear | Control element. | 11 | 14 | 25 | 23 | 15 | 24 | 22 |
|---|---|---|---|---|---|---|---|---|
| 1 | | x | | | (x) | | x | |
| 2 | | x | | | | x | | |
| 3 | | x | | x | | | | |
| 4 | | | | x | | x | | |
| R | | | x | | x | | | |
| P | | | | | | | | x |

In accordance with the Table, the first gear is attained by engagement of the first clutch 11, or by engagement of the sphere 28a in the clearance 30 of the first sun gear 10 in the FIGS. 2 or 3 embodiments, thereby connecting torque converter turbine 5 with the first sun gear 10. The torque reaction of the planetary gear train is obtained by way of planetary gear carrier 9, which during the acceleration period is secured in position by freewheel 24. This braking effect of the freewheel can optionally be assisted during acceleration under load by the braking effect of the multiple disc brake 23, which facilitates braking action in both directions, and thus can also provide engine braking operation. Brake 23 connects the planetary gear carrier 9 with the transmission housing. The stator 6 of the torque converter 1 is connected with the planetary gear carrier 9 by way of second freewheel 7, and likewise bears on the transmission housing by way of the first freewheel 24 and the first brake 23 respectively. Second forward gear is obtained by securing the second sun gear 13 in position with respect to the housing by means of brake 15, while the first clutch, and respectively in FIGS. 2 and 3 the spherical body 28a are engaged, thereby connecting the output turbine 5 of torque converter 1 with the first sun gear 10.

In the third, or direct drive gear, the band brake 15 is released, and the third clutch 25 is engaged. Since the planetary gear system is connected by means of both the planetary gear carrier 9 connected to impeller 4, and by the first sun gear 10 which is connected by clutch 11 to rotor 5, the planetary gear system is in fact locked in a single position and the entire planetary gear train rotates as a single unit with a transmission ratio of one-to-one, directly connecting the output shaft 20 with the turbine shaft 12 and the hollow shaft 8. Because of the engagement of the third clutch 25 in third gear, a torque division is obtained with a partial bridging of the torque converter 1 by means of direct connection of the impeller 4 to the planetary gear carrier 9, and then to the inertial ring gear 19 and the output shaft 20.

In the fourth forward gear there is produced a speed increasing gear ratio between the output shaft 20 and the input shaft 3. In this speed the band brake 15 is engaged in addition to the third clutch 25, while clutches 11 and 14 are disengaged. Engagement of band brake 15 secures the second sun gear 13 in position, and the impeller 4 of the torque converter drives the planetary gear carrier around the second sun gear 13, which provides an increase in the rotational speed which is imparted to the inertial gear 19. In this gear there is complete bridging of the torque converter as the engine shaft 3 is connected by means of impeller 4 to the planetary gear carrier 9 by means of clutch 25, and turbine 5 is disconnected from the gear train.

Reverse gear is obtained by the use of second clutch 14 and brake 23, which connects the planetary gear carrier 9 to the transmission housing. In reverse speed, the second sun gear 13 drives the second planetary gear 17 which drives the inertial gear 19 in a reverse direction, also rotating output shaft 20 in a reverse direction.

In the neutral and parking position, none of the shifting elements in the transmission is acted on, and in the parking position a ratchet element is used to engage the parking toothing 22 on the outside of inertial gear 19.

The gear shifting arrangement for the embodiments of FIGS. 2 and 3 are substantially the same as for the embodiment of FIG. 1. Clutches 11 and 14, which engage the first or second sun gears, are replaced by the draw key arrangement 26, illustrated in those FIGS. 2 and 3. In this arrangement it is not possible to provide a shift position wherein both sun gears are disconnected from the turbine shaft 12'. Accordingly, a fourth clutch 31 is provided in the FIG. 2 embodiment to disconnect the shaft connection to the sun gears while operating in fourth gear, or while in neutral or parking positions. The draw key arrangement can only be shifted when the turbine shaft is stationary. This condition is attained on shifting from one of the forward gears to the reverse gear, when the transmission passes over the idling or neutral position, and when turbine shaft 12' is disengaged from the turbine 5.

As has been described as a replacement to the provision of the fourth clutch, the torque converter may be designed to provide for filling and draining of the fluid cavity by a valve 32 illustrated in FIG. 3. In this embodiment, the hydraulic clutch action of the torque converter is eliminated by opening the filling valve 32 and draining the torque converter cavity. Accordingly, the converter filling valve is opened in the fourth gear in the idling position and in the parking position.

While there have been described what are believed to be the preferred embodiments of the invention, those skilled in the art will recognize that other and further modifications may be made thereto without departing from the spirit of the invention, and it is intended to claim all such embodiments as fall within the true scope of the invention.

We claim:
1. A motor vehicle transmission comprising:
   (1) a hydrodynamic torque converter including a driving impeller connected to an input shaft, a stator and and output turbine;

(2) and a planetary gear train and control system in a stationary gear housing, including:
 (a) a first sun gear;
 (b) a second sun gear arranged on the side of said first sun gear away from said torque converter;
 (c) an inertial ring gear having a power output;
 (d) a planetary gear carrier;
 (e) a first planetary gear mounted on said planetary gear carrier and meshing with said first sun gear;
 (f) a second planetary gear mounted on said planetary gear carrier and meshing with said first planetary gear, said second sun gear and said inertial gear;
 (g) first controllable clutch means for interconnecting said first sun gear and said impeller by said output turbine;
 (h) second controllable clutch means for interconnecting said second sun gear and said impeller by said output turbine;
 (i) third controllable clutch means for interconnecting said planetary gear carrier and said impeller;
 (j) a first freewheel arranged radially outward from said planetary gear train, connecting said planetary gear carrier and said housing;
 (k) a second freewheel connecting said stator and said planetary gear carrier;
 (l) a first controllable brake arranged radially outward from said gear train and selectively connecting said housing and said planetary gear carrier;
 (m) and a second controllable brake arranged on the side of said gear train away from said torque converter and selectively connecting said housing and said second sun gear.

2. A transmission as specified in claim 1 wherein there is provided a hollow shaft connecting said planetary gear carrier and said second freewheel and wherein said third clutch means connects said hollow shaft and said impeller.

3. A transmission as specified in claim 1 or claim 2 wherein there is provided a central shaft, and wherein said first and second clutch means comprise a draw key assembly for connecting said central shaft and said sun gears, and controllable means for connecting said central shaft to said impeller by said turbine.

4. A transmission as specified in claim 3 wherein said controllable connecting means comprises a clutch connecting said shaft and said turbine, and said turbine is connected to said impeller by hydraulic fluid coupling.

5. A transmission as specified in claim 3 wherein said shaft is connected to said turbine, and wherein said controllable connecting means comprises hydraulic fluid connecting said turbine and said impeller over a fluid space, and valve means for filling and draining the hydraulic fluid in said fluid space.

* * * * *